May 8, 1962  B. E. JOHNSON  3,033,298
SLUDGE REMOVAL BONNET FOR CORE DRILLS AND THE LIKE
Filed May 11, 1961  2 Sheets-Sheet 1
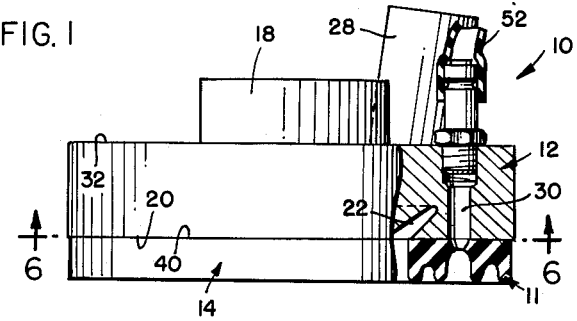
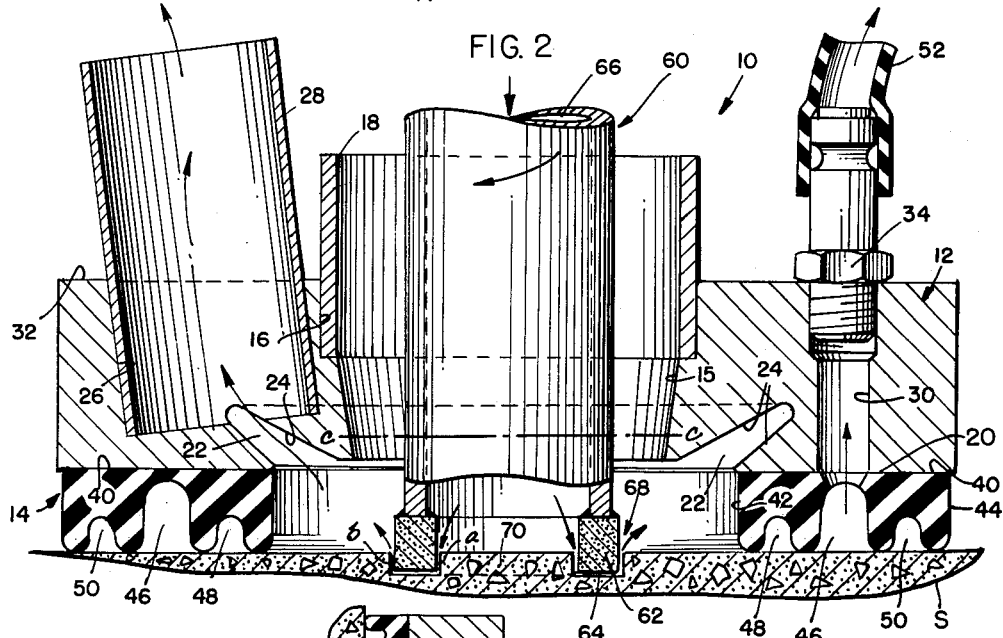
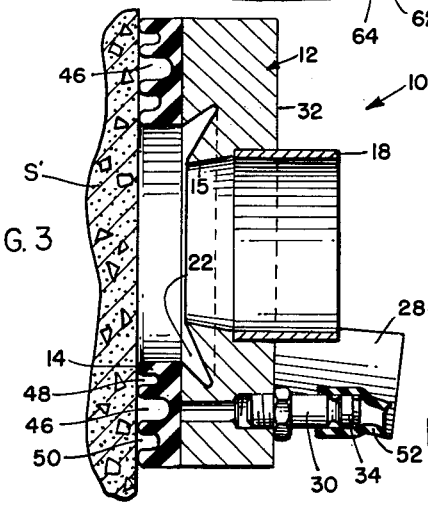
*INVENTOR:*
BERT E. JOHNSON
BY
*Norman Gerlach*
ATT'Y May 8, 1962   B. E. JOHNSON   3,033,298
SLUDGE REMOVAL BONNET FOR CORE DRILLS AND THE LIKE
Filed May 11, 1961   2 Sheets-Sheet 2
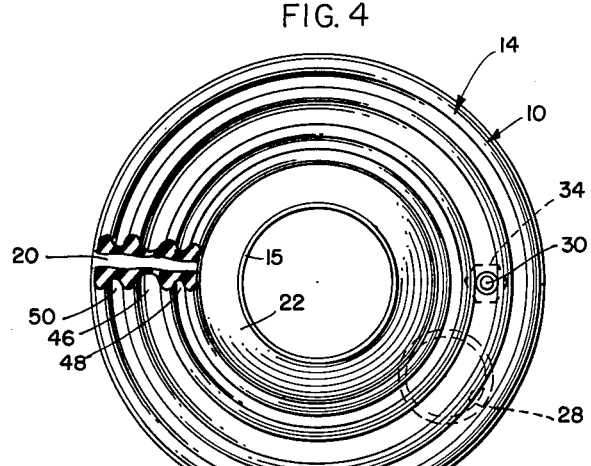
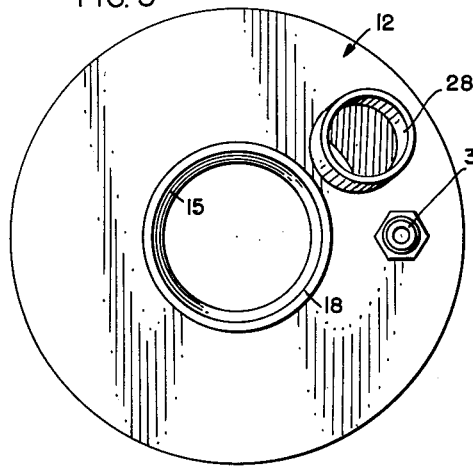
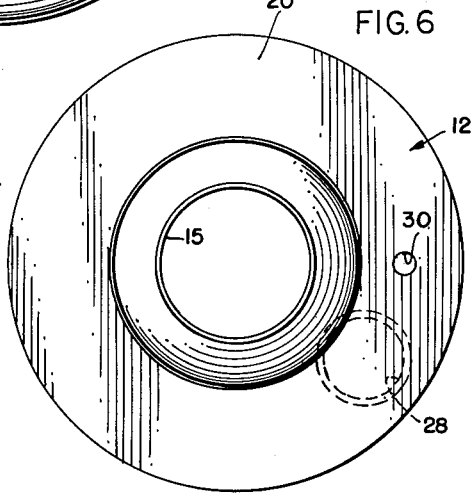
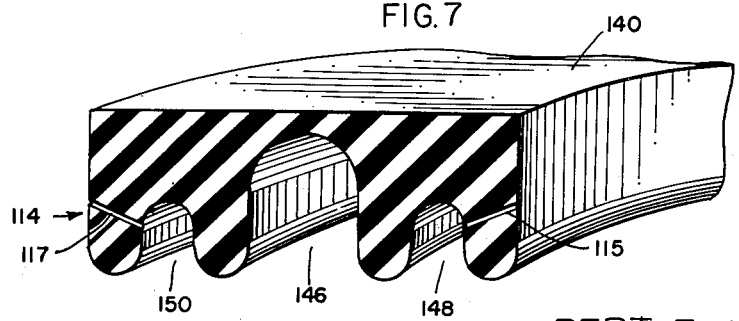
INVENTOR:
BERT E. JOHNSON
BY
ATT'Y

United States Patent Office

3,033,298
Patented May 8, 1962

1

3,033,298
SLUDGE REMOVAL BONNET FOR CORE DRILLS
AND THE LIKE
Bert E. Johnson, 856 W. Agatite Ave., Chicago 40, Ill.
Filed May 11, 1961, Ser. No. 109,437
11 Claims. (Cl. 175—209)

The present invention relates generally to sludge removal apparatus for core drills and the like and has particular reference to a small, compact core drill bonnet which is adapted to surround the working area of a core drill and, by making sealing contact with the flat surface of the work undergoing drilling, establishes in the immediate vicinity of the drill shank a localized artificial reservoir from which the sludge resulting from the drilling operation cannot escape, while at the same time, the thus-confined sludge is withdrawn by suction from the working area of the core drill.

The improved sludge removal apparatus comprising the present invention has been designed for use primarily in connection with a core drill employing a tubular drill shank having at its operative cutting end an annular cutting element which is in the form of crushed or fragmented diamonds in a metallic matrix and embodies a circular cutting edge at its lower end. In such a core drill liquid coolant such as water is fed to the interior of the drill shank and thence to the cutting edge as this edge rotates in contact with the work undergoing drilling. The principal use contemplated for the present core drill bonnet is in connection with such a core drill when the latter is employed for drilling a hole in a flat concrete surface such as a floor, wall or the like. However, other uses are contemplated and the bonnet construction of the present invention will be found useful, merely by modification as to size, in connection with such core drills when the latter are put to use for drilling holes in vitreous or ceramic materials such as glass, tile, porcelain, marble, Pyrex, tungsten carbide and the like. The invention is not limited to use with liquid-cooled core drills, nor, in fact, to drills having tubular shanks, and it is contemplated that the present bonnet construction will be found useful in connection with dry drilling operations performed with a wide variety of drill shanks for drilling, countersinking and performing other similar localized operations on various materials such as plaster, tile, wood, or the like where it is desired to eliminate tailings dust, etc., in which cases, the suction which is applied to the localized area in the vicinity of the tool shank will effectively withdraw the objectionable material.

By means of the present invention, especially when the same is employed in connection with diamond core drills for drilling holes in concrete, not only is removal of sludge from the immediate vicinity of the working area of the drill shank desirable from the standpoint of cleanliness and convenience to the operator who is not obliged to stand in a pool of the excrescent sludge, but also rapid removal of sludge from the immediate vicinity of the working surface of the drill shank is desirable in order to clear the path for more efficient operation of the tool to the end that there will be no clogging of the same and a more rapid cut may be attained.

The provision of a core drill bonnet construction of the character briefly outlined above and possessing the stated advantages being among the general objects of the invention, it is a further object to provide such a bonnet construction wherein the bonnet head is completely detached from the core drill but is capable of being fixedly secured in operative position with respect to the surface of the work by suction means which is continuously applied to the same during operation thereof and which is discontinued when it is desired to remove the bonnet construction or to shift its position relatively to the work. By such an arrangement, the use of fastening devices, together with the tools required for manipulating them, is eliminated.

It is a further object of the invention to provide a core drill bonnet which may, without modification or alteration of its component parts, be applied either to a vertically operating drill or to a horizontally operating drill.

Yet another object of the invention is to provide a core drill bonnet having associated therewith a novel form of compartmented suction ring having isolated suction chambers, certain of which are sealed suction chambers and at least one other of which is capable of being operatively connected to a source of subatmospheric pressure, the latter chamber operating, when rendered effective, also to render the sealed suction chambers effective.

A similar and related object is to provide such a suction ring wherein the sealed suction chambers are rendered ineffective at the end of any given drilling operation by discontinuance of the application of suction to the suction-connected chamber and by slow leakage of the sealed suction chambers to the atmosphere.

The provision of a core drill bonnet which is extremely simple in its construction and, therefore, may be manufactured at a low cost; one which is comprised of a minimum number of separate parts thereby further contributing toward economy of manufacture; one which has no moving parts and which, therefore, is unlikely to get out of order; one which is rugged and durable and, hence, will withstand rough usage; one which is extremely compact and which, therefore, consumes but little space in and about the working area of the core drill; one which is of lightweight construction and which may easily be manipulated; and one which otherwise is well-adapted to perform the services required of it; are further desirable features which have been borne in mind in the production and development of the present invention.

Other objects and advantages of the invention, not at this time enumerated, will become more readily apparent as the nature of the invention is better understood.

In the accompanying two sheets of drawings forming a part of this specification, two illustrative embodiments of the invention and two different environments for one of the embodiments have been illustrated.

In these drawings:

FIG. 1 is a side elevational view partly in section of a core drill bonnet constructed in accordance with the principles of the present invention and embodying one form of the invention;

FIG. 2 is a enlarged sectional view taken substantially centrally and vertically through the core drill bonnet of FIG. 1 and showing the same operatively applied to a core drill in operation on a horizontal surface and illustrating schematically by way of arrows the manner in which sludge is removed from the bonnet reservoir;

FIG. 3 is a sectional view similar to FIG. 2 but illustrating the bonnet when used in connection with horizontal drilling of a vertical surface;

FIG. 4 is a bottom plan view, partly in section, of the bonnet;

FIG. 5 is a top plan view of the bonnet;

FIG. 6 is a sectional view taken on the line 6—6 of FIG. 1; and

FIG. 7 is a fragmentary perspective view, partly in section, of a sealing ring employed in connection with a modified form of the invention.

Referring now to the drawings in detail, and in particular to FIGS. 1 and 2, a core drill bonnet constructed in accordance with the principles of the present invention has been designated in its entirety at 10 and is comprised of two principal parts, namely, a bonnet body 12 and an annular sealing ring 14. The bonnet body 12 is in the form of a solid annulus having formed therein a slightly tapered central bore 15, the upper rim region of which is recessed as at 16 to provide a seat for telescopic reception of a cylindrical reservoir-forming wall 18. The body 12 may be formed of a suitable metal such as stainless steel, aluminum, or other noncorrosive material, or it may be formed of a suitable plastic material, such as Lucite or similar thermosetting phenolic condensation product. The cylindrical wall 18 may also be formed of like material.

The flat annular underneath face 20 of the body 12 is undercut as at 22 to provide a continuous annular inclined groove which has tapering side walls 24 and extends from a region adjacent to the inner periphery of the body 12 upwardly and radially outwardly to a medial region within the body. The groove 22 communicates at one eccentric region of the body with a relatively deep cylindrical socket 26; and a cylindrical coolant take-off tube 28 has its lower end region seated within the socket 26 and secured therein in any suitable manner as, for example, by a press-fit, or by being welded or cemented. The axis of the tube 28 may be slightly inclined from the vertical for clearance purposes in connection with the cylindrical wall 18, as will become clear presently.

At another eccentric region of the body 12, preferably not far removed from the region of the tube 28, the body is formed with a vertical bore or passage 30 which extends between the flat annular upper face 32 of the body and the flat annular bottom face 20 thereof. The upper rim region of the bore 30 is screw-threaded so as to receive therein a conventional nipple fitting 34.

Suitably secured to the underneath annular face 20 of the body 12 is the previously-mentioned annular sealing ring 14. The latter is formed of a suitable resilient elastomeric material, such as rubber, either natural or synthetic, a rubber substitute, such as Hycar, Buna, or the like, or a rubber-impregnated fabric. It is provided with a flat annular upper face 40, inner and outer cylindrical sides 42 and 44, respectively, and a grooved bottom face including a relatively deep, continuous, annular central groove 46, and a pair of shallow grooves 48 and 50, respectively, on opposite sides of the central groove 46.

The three grooves 46, 48 and 50 constitute suction grooves, the grooves 48 and 50 being sealed and isolated grooves when the bonnet is in use, as will be described presently, while the groove 46 is a communicating groove which is adapted to be operatively connected to a suitable source of subatmospheric pressure, such, for example, as the inlet side of a suction pump (not shown). Accordingly, the groove 46 communicates with the lower end of the bore 30 in the body 12 as shown at the right-hand side of FIG. 2, and the nipple 34 is adapted to be operatively connected to a flexible line or hose 52 leading to the source of subatmospheric pressure. The tube 28 is adapted to be operatively connected to the suction side of a suitable fluid suction pump (likewise, not shown) by means of a flexible conduit (also not shown).

In FIG. 7, a slightly modified form of sealing ring has been shown and designated in its entirety at 114. This sealing ring 114 is substantially identical with the ring 14 except for the provision of two small bleeder passages 115 and 117, one for the otherwise sealed suction groove 148 and the other for the suction groove 150. The function of these bleeder passages will be made clear when the description of the operation of the apparatus is set forth. Due to the similarity between the two sealing rings 14 and 114, needless repetition of description has been avoided by the application of similar reference numerals but of a higher order to the parts in FIG. 7 which have corresponding parts in FIG. 2.

The operation of the core drill bonnet of FIGS. 1 to 6, inclusive, in connection with a conventional core drill which is in use for drilling a vertical hole in a horizontal concrete slab, such as a floor slab S or the like, is illustrated somewhat schematically in FIG. 2, wherein the rotatable drill shank has been designated in its entirety at 60. The shank is in the form of a seamless steel tube to the lower end of which there is affixed a diamond impregnated cutting element 62, the lower rim 64 of which is adapted to engage the work. Conventional means are provided for feeding a coolant fluid, such as water, into the interior passage 66 of the hollow drill shank under pressure. The shank 60 is shown as being in the process of drilling a hole in the concrete slab S, the rotating annular cutting element serving progressively to form an annular socket 68 in the slab. Such socket surrounds a central concrete core 70 which, as the shank descends into the concrete, progressively increases in length until such time as the end of the shank passes completely through the slab or until the desired depth of hole has been reached.

The coolant fluid which is fed to the interior of the hollow shank 60 flows downwardly through the annular space designated at $a$ existing between the inside face of the tubular shank wall and the core 70 and passes around the forward or outer rim of the cutting element 62, from whence it follows a reentrant path through the outside annulus $b$ existing between the wall of the shank and the surrounding cylindrical surface of the hole or socket 68. The radial width or thickness of the cutting element 62 is slightly greater than the radial width or thickness of the cylindrical wall of the metal shank 60 so that relatively narrow upwardly facing shoulders exist on the upper side of the cutting element and these shoulders serve to create the two narrow annular spaces $a$ and $b$, previously described, during descent of the shank 60 into the concrete.

Prior to commencement of a drilling operation, the core drill bonnet proper 10 of the present invention having the elastomeric sealing ring 14 associated therewith is positioned centrally or concentrically around the drilling area, as shown in FIG. 2, and the underneath side of the sealing ring 14 is seated upon the upper face of the concrete slab S. With the bonnet thus positioned, the operation of the suction pump which serves the fluid line 52 is commenced and, upon consequent drop in air pressure within the central groove, causes the sealing ring 14 as a whole to be drawn tightly downwards against the upper face of the slab with the result that the bonnet is fixedly anchored in position around the drilling area. Upon such movement of the bonnet into firm contact with the slab S under the influence of suction, the annular lips which define the grooves 48 and 50 will be compressed and air will be expelled from these grooves around the lips in the usual manner of operation of conventional suction cups. The grooves 48 and 50 thus serve as auxiliary sealed suction cups to augment the action of the groove 46 in holding the bonnet in position on the slab. Furthermore, the various lips associated with the grooves 48 and 50 will function as dual sealing lips on each side of the groove 46 in order doubly to insure the efficiency of the groove as a suction creating media during operation of the pump.

The shank 60 of the core drill is passed through the cylindrical wall 18 and, as soon as the core drill is set into operation, the fluid suction pump which serves the aforementioned flexible conduit is set into operation and the suction which is created in the tube 28 is communicated through the groove 22 to the central opening or bore 15 in the bonnet body 12. The coolant and such sludge particles as may have been loosened during the drilling operation and which have arisen upwardly through the annulus $b$ and collected in the reservoir which is created within the lower regions of the bore 15 are evacuated through the annular groove 22 and tube 28. It is to be noted at this point that due to the comparatively great width of the annular inclined groove 22 and to the comparatively narrow width of the annulus $b$ existing between the concrete core 70 and the outer wall of the annular socket 68 undergoing drilling, rapid evacuation of the sludge will take place, each increment of sludge entering the reservoir at the bottom of the central opening 15 in the bonnet body 12 being immediately pulled by section into the groove 22 and outwardly through the tube 28. The level of sludge in the reservoir will seldom, if ever, rise above the lower rim of the groove 22, although due to high turbulence in the vicinity of the rotating shank 60, some sludge particles or coolant droplets may rise in the bore 15 against the downdraft created in the cylindrical wall 18. The dotted line c—c of FIG. 2 represents the highest level of material which may be expected within the bore 15.

After a drilling operation has been completed, the two suction pumps may be disabled or stopped and, upon the consequent relieving of suction in the central annular groove 46, the suction in the grooves 48 and 50 will gradually diminish due to leakage or bleeding of the grooves to atmosphere around the confining lips of these grooves under the influence of the porous concrete material of the slab S. The residual suction effected by the grooves 48 and 50 will seldom be of more than ten to fifteen seconds' duration where concrete slabs are concerned.

The operation of the bonnet 10 in connection with the drilling of a hole in a vertical concrete surface has been illustrated in FIG. 3. This operation is similar to the previously-described operation for drilling a hole in a horizontal surface, and the procedure involved is substantially the same except for the fact that it is necessary to position the sealing ring 14 against the vertical surface with the bonnet body so oriented that the socket 26 and the cylindrical wall 28 assume the lowermost position in the assembly of which it is capable of assuming. The slab undergoing drilling in FIG. 3 is designated at S'. In connection with such horizontal drilling, the coolant will flow by gravity downwardly in the reservoir within the bore 15 and along the surface of the slab and directly into the bottom regions of the annular groove 22. Little, if any, sludge, other than that which may be flung under the influence of turbulent conditions in the region of drilling, will find its way into the upper regions of the now horizontally disposed reservoir. The draft within the cylindrical wall 18 will keep such flinging of particles in a subdued state and to a minimum.

When the present bonnet is to be employed in connection with the drilling of glass plates, ceramic materials, and the like, it may be found expedient to employ the sealing ring 114 of FIG. 7 in place of the sealing ring 14. In such an instance, the bleeder passages 115 and 117 will serve to bleed the otherwise sealed grooves 148 and 150 to atmosphere and, in addition, relieve in these grooves the suction which is created when the elastomeric material of the ring 114 tends to assume its normal state immediately after the suction exerted by the pump which serves the central groove 146 has been discontinued. In the absence of such bleeder passages, and due to the nonporous nature of the material undergoing drilling, the grooves 148 and 150 would serve as suction cups and it would be necessary manually to break the suction bond by a prying operation with the attendant danger of rupturing the elastomeric material of the sealing ring 114. However, where the bleeder passages 115 and 117 are provided, the grooves 148 and 150 have a suction cup effect only at such time as the suction in the central groove 146 is discontinued at the end of a drilling operation, and this suction effect is of limited duration, it taking place only during the time that the elastomeric material, now freed from compressional forces by termination of the operation of the suction pump, tends to assume its natural condition. While the suction is, in effect, within the central groove 146, this suction is maintained effective by the provision of two continuous circular sealing lips on each side of the groove, the inner and outer grooves 148 and 150, respectively, serving no purpose other than that of providing this dual lip-sealing effect.

On the other hand, it may, under some circumstances, be desirable to employ the sealing ring 14 when operating upon glass or other nonporous materials. In such instances, only an initial suction impulse need be applied by the pump which serves the central groove 46. Such an impulse will draw the sealing ring 14 firmly into operative sealing engagement with the surface undergoing drilling and cause the air within the grooves 48 and 50 to be expelled and thus create a suction within these grooves which then will function as true suction cups. The suction will remain in effect unassisted and the operation of the suction pump may be discontinued during the actual drilling operation, although, of course, the operation of the fluid suction pump which serves the coolant collecting groove 22 will be continued during drilling operations. In this manner, an appreciable saving in power application will be effected.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. A drill bonnet for removing the products of abrasion from the immediate vicinity of the working end of a rotary drill, said bonnet comprising a bonnet body in the form of an annulus having a central opening formed therethrough and presenting upper and lower annular faces respectively, sealing means formed of elastomeric material secured to the lower face and presenting a pair of depending spaced parallel continuous concentric circular sealing lips extending around said face, said bonnet being adapted to be supported upon the surface of the work and to surround the drill with said lips in coextensive contact with said surface whereby, in combination with said surface, the space within the inner lip defines a confining reservoir for the products of abrasion and the space between said lips defines an annular suction chamber, said bonnet body being formed with a first passage therethrough in communication with the space between said lips and with a second passage therethrough in communication with the space within said inner lip, and means for connecting each of said passages to a source of subatmospheric pressure.

2. A drill bonnet as set forth in claim 1 and wherein each of said passages opens through said upper annular face of the bonnet body.

3. A drill bonnet as set forth in claim 1 and wherein said second passage is in the form of an annular groove in the lower annular face of the bonnet body which communicates with a bore which opens onto the upper annular face of the bonnet body.

4. A drill bonnet for removing the products of abrasion from the immediate vicinity of the working end of a rotary drill, said bonnet comprising a bonnet body in the form of an annulus having a central opening formed therethrough and presenting upper and lower annular faces respectively, sealing means formed of elastomeric material secured to the lower face and presenting a pair of depending spaced parallel continuous concentric circular sealing lips extending around said face, said bonnet being adapted to be supported upon the surface of the work and to surround the drill with said lips in coextensive contact with said surface whereby, in combination with said surface, the space within the inner lip defines a confining reservoir for the products of abrasion and the space between said lips defines an annular suction chamber, said bonnet body being formed with a first passage therethrough in communication with the space between said lips, there being an annular groove in said lower face of the bonnet body within the confines of said inner lip, and a second passage in said body in communication with said annular groove, and means for connecting each of said passages to a source of subatmospheric pressure.

5. A drill bonnet as set forth in claim 4 and wherein said annular groove is provided with side walls which are inclined radially upwardly and outwardly and wherein the groove opens in part onto said lower face of the bonnet body and in part onto the wall of the central opening.

6. A core drill bonnet for removing abrasive-laden coolant from the immediate vicinity of the working end of a rotary core drill, said bonnet comprising a bonnet body in the form of a solid annulus having a central opening formed therethrough and presenting upper and lower flat annular faces respectively, a sealing ring of elastomeric material secured to the lower face and extending therearound in sealing relationship with respect thereto, said sealing ring being adapted to seat upon the surface of the work undergoing drilling in concentric relation to the drilling area and, in combination with such surface, define a central coolant-confining reservoir in open communication with the central opening in the bonnet body, the underneath surface of said sealing ring being formed with a continuous circular medial groove therearound, said bonnet body being formed with a first passage therethrough in communication with said circular groove and with a second passage therethrough in communication with the central opening, and means for connecting each of said passages to the suction side of a fluid pump.

7. A core drill bonnet as set forth in claim 6 and wherein the underneath surface of said sealing ring is formed with an additional continuous circular groove around and in concentric relation with said medial groove.

8. A core drill bonnet as set forth in claim 6 and wherein the underneath surface of said sealing ring is formed with an additional circular groove around and in concentric relation with said medial groove and disposed between the same and the inner periphery of the sealing ring.

9. A core drill bonnet as set forth in claim 6 and wherein the underneath surface of the sealing ring is formed with an additional circular groove around and in concentric relation with said medial groove and disposed between the same and the outer periphery of the sealing ring.

10. A core drill bonnet as set forth in claim 6 and wherein the underneath surface of the sealing ring is formed with two additional circular grooves therearound concentric with said medial groove, one of said additional grooves being disposed between the medial groove and the inner periphery of the sealing ring and the other of said additional grooves being disposed between the medial groove and the outer periphery of the sealing ring.

11. A core drill bonnet as set forth in claim 10 and wherein said second passage in the bonnet body is in the form of a circular groove which extends around the lower face of the bonnet body and which communicates with an opening in the upper face of the bonnet body.

References Cited in the file of this patent

UNITED STATES PATENTS

| | | |
|---|---|---|
| 1,251,258 | Magill | Dec. 25, 1917 |
| 2,829,867 | Brochetti | Apr. 8, 1958 |
| 2,946,246 | Allan | July 26, 1960 |

FOREIGN PATENTS

| | | |
|---|---|---|
| 3,827 | Great Britain | Feb. 20, 1908 |